Patented Feb. 19, 1952

2,586,593

UNITED STATES PATENT OFFICE 2,586,593

MANUFACTURE OF INTERPOLYMERS OF STYRENE WITH UNSATURATED FATTY ACIDS AND POLYHYDRIC ALCOHOLIC ESTERS THEREOF

Frank Armitage, London, and John Joseph Sleightholme, Carlisle, Cumberland, England, assignors, by mesne assignments, to The Sherwin-Williams Company, Cleveland, Ohio, a corporation of Ohio No Drawing. Application October 27, 1949, Serial No. 123,972. In Great Britain October 28, 1948

15 Claims. (Cl. 260—23)

This invention is for improvements in or relating to the manufacture of interpolymers of styrene with unsaturated fatty acids and polyhydric alcoholic esters thereof and has for an object to provide a control for the manufacture of interpolymers of styrene where these polymers are prepared in the presence of terpene compounds as controlling agents.

In prior British Patents Nos. 580,912 and 580,913 there has been described the effect upon the above interpolymerisation reactions of mono- and di-cyclic terpenes.

We have now found that, in certain instances, difficulties are encountered in the production of clear homogeneous products. This has been traced down to the different batches of terpene used in the process.

The differences have been found to be wholly unpredictable and, in the commercial operation of such processes involving the use of terpenes, it has been necessary to test each batch of terpene to select those which, in an experimental reaction, will produce clear products; those batches of terpene which, on test, lead to the production of opalescent products were thereby shown to be unsuitable for use in the reaction and have, therefore, had to be diverted to other uses.

We have now found that by a pretreatment of the terpenes, we can avoid the necessity of having to carry out experiments to determine the suitability or otherwise of a batch of terpenes for use in the interpolymerisation of styrene by processes such as those described in the specifications above referred to.

According to the present invention, therefore, there is provided a process for the manufacture of interpolymers of styrene with unsaturated fatty acids and polyhydric alcohol esters thereof which comprises effecting the interpolymerisation of styrene in the presence of an activated mono- or di-cyclic alpha-terpene, which terpene has been activated by blowing with air or oxygen; the activation of the terpene may be effected, for example, by blowing with air at room temperatures.

The following examples illustrate the effect of utilising terpenes activated by blowing with air at room temperatures for three days.

*Example 1.*—In this example a standard reaction mixture was employed, the composition of the mixture being as follows:

Into a solvent mixture consisting of 50 parts of white spirit and 5 parts of solvent naphtha, there were mixed 35 parts of monomeric styrene and 50 parts of an enamel oil, prepared by heating together 2 parts of the conjugated linseed oil sold under the trade name "Conlinol," with 1 part of oiticica oil and the mixture was heated at 250° C. until it attained a viscosity of 15 to 20 poises as determined at a temperature of 25° C.

The various tests were carried out by adding 10 parts of the various terpenes or terpene fractions to the above standard reaction mixture and then heating the reaction mixture under reflux.

In the following experiments the results are set out in pairs the experiment (a) in each case indicating the terpene as delivered by the makers, i. e. non-activated terpene, whilst the experiments indicated at (b) are experiments in which the terpene had been activated by the process of the present invention:

| | Time, Hrs. | Viscosity | Solids, per cent | Film |
|---|---|---|---|---|
| Experiment 1: | | | | |
| (a) | 15 | 80 | 55.4 | C. |
| (b) | 10½ | 103 | 55 | C. |
| Experiment 2: | | | | |
| (a) | 15 | 72 | 52.3 | C. |
| (b) | 12½ | 116 | 55 | C. |
| Experiment 3: | | | | |
| (a) | 15 | 24 | 50.5 | O. |
| (b) | 10¼ | 83 | 55 | C. |
| (b)[1] | 12¾ | 91 | 55 | C. |
| Experiment 4: | | | | |
| (a) | 15 | 23 | 50 | O. |
| (b) | 12½ | 48 | 54 | C. |
| Experiment 5: | | | | |
| (a) | 17½ | 115 | 53 | C. |
| (b) | 14½ | 74 | 53 | C. |
| Experiment 6: | | | | |
| (a) | 17½ | 73 | 53 | C. |
| (b) | 14½ | 90 | 55 | C. |

[1] The third result given in experiment 3 was obtained with the terpene which had been allowed to stand for about 3 months after having been activated.

The figures of viscosity are all quoted as seconds in No. 4 Ford Cup at 20° C. and the legends in the final column are the letter C representing the production of a clear film from the final product and the letter O representing the production of an opalescent film from the final product.

In experiments 1 and 2, the terpenes used were different samples of commercial dipentene which ordinarily contains from 50 to 60% of dipentene in admixture with minor proportions of alpha-terpinene and alpha-terpinolene.

Experiments 3 and 4 were similarly carried out on different batches of a special grade of dipentene similar to the commercial grade but containing different proportions of the dipentene, the alpha-terpinene and the alpha-terpinolene.

Experiments 5 and 6 were respectively carried out on rectified samples of dipentene and terpinolene.

*Example 2.*—This example illustrates the application of the invention to dicyclic terpenes, namely to the material known as gum turpentine which contains approximately 90% alpha-pinene, the residue being mostly beta-pinene.

The following experiments were carried out in a similar manner to those described in Example 1, the reaction mixture, however, being slightly different. In this example the reaction mixture was a mixture of 50 parts of the linseed oil oiticica enamel oil prepared as described in Example 1, with 35 parts of styrene, 10 parts of unactivated dipentene and 55 parts of gum turpentine.

The results obtained with an unactivated and an activated gum turpentine respectively are set out in the following table:

|  | Time, Hrs. | Viscosity | Solids, per cent | Film |
|---|---|---|---|---|
| Experiment 7: | | | | |
| (a) | 8 | 94 | 55 | sO. |
| (b) | 6½ | 95 | 56 | C. |

The final film produced from the unactivated sample of gum turpentine (experiment (a)) was a slightly opalescent film while that produced from the activated sample of gum turpentine (experiment (b)) was a completely clear film.

The following examples illustrate the effect of blowing terpenes with oxygen and show that activation is effected more rapidly than when air is used.

Example 3.—The following experiments were carried out in a similar manner to that described in the preceding examples by forming a reaction mixture of 80 gms. of a styrene, 80 gms. of alkali refined linseed oil, 40 gms. of oiticica oil in 117 gms. of white spirit as solvent and adding thereto 17 gms. of commercial dipentene and then boiling the reaction mixture for 26½ hours in a vessel fitted with a reflux condenser. The two experiments were the same except that in experiment (a) the dipentene was used exactly as supplied by the manufacturer whilst in experiment (b) the same dipentene was activated (before addition to the reaction mixture) by blowing with a slow stream of oxygen for 16 hours at room temperature.

The results of the experiments were as follows:

|  | Viscosity | Solids, per cent | Film |
|---|---|---|---|
| Experiment 8: | | | |
| (a) | 20 | 51 | clear. |
| (b) | 23 | 53 | clear. |

It will be noted that the activated dipentene gave rise to a product having a higher viscosity and a greater solids content; the product of experiment (b) was also somewhat clearer than that of experiment (a).

The viscosity figures were measured in a Ford No. 4 Cup at 25° C.

Example 4.—The following experiments were carried out in a similar manner to that described in Example 3 utilising a reaction mixture made up from 50 gms. of a 7-poise dehydrated castor oil, 50 gms. of styrene and 80 gms. of xylene as solvent to which was added 20 gms. of dipentene; the reaction was again effected under refluxing conditions and the two experiments were carried out (a) with the unactivated dipentene and (b) with the dipentene activated as in Example 3. Samples were withdrawn from the two reaction mixtures after 8 hours to test them for viscosity increase and for solids content and the reactions were stopped after 16 hours for tests of the products and all the results are shown in the following table:

|  | Time, Hrs. | Viscosity | Solids, per cent | Film |
|---|---|---|---|---|
| Experiment 9: | | | | |
| (a) | 8 | 13 | 36 | |
| (a) | 16 | 15 | 43 | |
| (b) | 8 | 16 | 47 | Opaque. |
| (b) | 16 | 16 | 49 | Slightly opalescent. |

The tabulated results show that the rate of viscosity increase and the rate of increase of solids content were very much greater when using the activated dipentene as will be seen from the fact that the viscosity had reached its maximum value after 8 hours and further that the solids content increased only slightly during the second 8 hours refluxing; the improvement in clarity of the film arising from the use of the activated dipentene was very marked.

The results appear to indicate that the activated dipentene possessed catalytic properties.

The viscosity figures were measured in a Ford No. 4 Cup at 25° C.

Although the invention has been illustrated in the foregoing examples only with reference to certain drying oils and blends thereof, the effect of the activated terpenes is the same when other natural or synthetic drying oils including blown and bodied oils commonly used in the manufacture of paint and like media are employed and the examples are to be regarded as only representative and not limiting in character. Moreover, the invention is operative in respect of the class of paint media known as oil-modified alkyd resins in which the radicals of drying oil fatty acids enter into the esters produced by the interaction of polybasic acids with polyhydric alcohols.

Furthermore, it is to be understood that synthetic drying oils, such as are produced by the esterification of polyhydric alcohols other than glycerol with the fatty acids of drying oils, for example, the esters of pentaerythritol, are included within the scope of the term "drying oil."

It will be observed that in all of the examples where an opalescent film was produced with the unactivated terpene, the film produced when the same terpene was used after activation was clear or at least clearer.

A second result which is noticeable from the results in the examples given above is that, in all instances, as compared with results obtained with the unactivated terpenes the same viscosities were achieved in a lesser time, or, alternatively, a greater viscosity was obtained in the same time when using the activated terpene whilst, in addition, the same solids content was obtainable in a lesser time or a greater solids content was obtainable in the same time when the terpene used was an activated terpene.

It would therefore appear that the activation treatment not only has the effect of avoiding the production of opalescent films (indicating non-homogeneity in the product), but it also has the effect of speeding up the reaction with the production of a product having a higher solids content or a higher viscosity at the conclusion of the reaction.

References in the foregoing description to polyhydric alcohol esters of unsaturated fatty acids are, of course, to be understood as including the mixed esters of one or more polyhydric alcohols with a mixture of fatty acids of which fatty acids a substantial proportion are unsaturated. In previous patents, such as prior British Patent No. 573,809, reference has been made to "polyhydric alcoholic mixed esters" and the present invention is to be understood as including the interpolymerisation of styrene with such polyhydric alcoholic mixed esters including the mixed esters which are produced during the production of an oil-modified alkyd resin whether or no the modification of the alkyd resin is effected by the direct esterification process or by the ester interchange or the alcoholysis process. Prior to the initiation of the interpolymerisation of styrene with polyhydric alcoholic mixed esters, the said mixed esters may be in a partially polymerised state.

It will be understood that a variety of different types of unsaturated fatty acids may be present in the polyhydric alcoholic mixed ester, that is to say, that the unsaturated acids may contain, amongst other fatty acids, those which contain diene and triene unsaturation whether conjugated or not. It is preferred, however, that the mixture of fatty acids in the polyhydric alcoholic mixed ester should contain a proportion of conjugated diene and/or triene fatty acids in admixture with unsaturated fatty acids of other types.

The styrene can be added to the reaction mixture portionwise during the course of the reaction, that is to say that a portion only of the desired quantity of styrene is present in the initial reaction mixture and the remainder is added either continuously or discontinuously to the reaction mixture as the reaction proceeds; the terpene compounds may also, if desired, be added to the reaction mixture during the course of the reaction and, again, as in the case of styrene, a part only of the desired quantity of the terpene may be present in the initial reaction mixture and the remainder added continuously or discontinuously. The interpolymerisation reaction may also be carried out by heating under pressure.

Although reference has been made above only to styrene, it is to be understood that the expression "styrene" as used herein is intended to include the nuclear substitution derivatives thereof, such as the nuclear halogen-substituted styrenes and the nuclear alkyl-substituted styrenes.

We claim:

1. A process according to claim 15 wherein the alpha-terpene is a mono-cyclic alpha-terpene.

2. A process according to claim 15 wherein the alpha-terpene is a dicyclic alpha-terpene.

3. A process according to claim 15 wherein the terpene is activated by blowing with gaseous oxygen.

4. A process according to claim 3 wherein the activation is effected at room temperature.

5. A process according to claim 15 wherein the terpene is activated by blowing with air.

6. A process according to claim 5 wherein the activation is effected at room temperature.

7. A process for the manufacture of interpolymers of styrene which comprises heating styrene and a polyhydric alcohol ester containing drying oil fatty acid radicles in the presence of a mutual solvent and in the presence of an alpha-terpene which has been activated by blowing with a gas comprising molecular oxygen.

8. A process according to claim 7 wherein said polyhydric alcohol ester also contains the radicle of a polybasic carboxylic acid.

9. A process according to claim 7 wherein a portion of the desired amount of styrene is added to the initial reaction mixture and the remainder is added during the interpolymerisation reaction.

10. A process according to claim 7 wherein a portion of the desired amount of alpha-terpene is added to the initial reaction mixture and the remainder is added during the interpolymerisation reaction.

11. The process comprising heating styrene with a drying oil in the presence of an alpha-terpene which has been activated by blowing with a gas comprising molecular oxygen, said heating being continued until substantially the whole of the styrene has interpolymerised with the drying oil.

12. The process comprising heating styrene with a drying-oil modified alkyd resin in the presence of an alpha-terpene which has been activated by blowing with a gas comprising molecular oxygen, said heating being continued until substantially the whole of the styrene has interpolymerised with the drying-oil modified alkyd resin.

13. The process comprising heating styrene with drying oil fatty acids in the presence of an alpha-terpene which has been activated by blowing with a gas comprising molecular oxygen, said heating being continued until substantially the whole of the styrene has interpolymerised with drying oil fatty acids.

14. The process which comprises interpolymerising styrene with a drying oil in the presence of dipentene which has been activated by blowing with a gas comprising molecular oxygen.

15. A process for the manufacture of interpolymers comprising heating a compound selected from the class consisting of styrene, nuclear alkyl substituted derivatives thereof and nuclear halogen susbtituted derivatives thereof and a compound selected from the class consisting of drying oil fatty acids and polyhydric alcoholic esters thereof, in the presence of an alpha terpene which has been activated by blowing with a gas comprising molecular oxygen.

FRANK ARMITAGE.
JOHN JOSEPH SLEIGHTHOLME.

REFERENCES CITED

The following references are of record in the file of this patent:

UNITED STATES PATENTS

| Number | Name | Date |
|---|---|---|
| 2,409,276 | Harvey | Oct. 15, 1946 |

FOREIGN PATENTS

| Number | Country | Date |
|---|---|---|
| 580,912 | Great Britain | Sept. 24, 1946 |
| 580,913 | Great Britain | Sept. 24, 1946 |
| 609,749 | Great Britain | Oct. 6, 1948 |